(12) United States Patent
Perlmutter et al.

(10) Patent No.: US 9,285,502 B2
(45) Date of Patent: Mar. 15, 2016

(54) SYSTEM AND METHOD FOR LACUNARITY ANALYSIS

(75) Inventors: Martin A. Perlmutter, Houston, TX (US); Michael J. Pyrcz, Humble, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 471 days.

(21) Appl. No.: 12/633,630

(22) Filed: Dec. 8, 2009

(65) Prior Publication Data

US 2011/0137565 A1  Jun. 9, 2011

(51) Int. Cl.
  G06F 19/00 (2011.01)
  G01V 11/00 (2006.01)

(52) U.S. Cl.
  CPC .......... *G01V 11/00* (2013.01); *G01V 2210/665* (2013.01)

(58) Field of Classification Search
  CPC ..................................................... G01V 11/00
  USPC .......... 702/6, 11, 13, 155, 156, 179; 382/109, 382/108, 278, 277; 703/10
  See application file for complete search history.

(56) References Cited

U.S. PATENT DOCUMENTS

| 4,991,095 A | 2/1991 | Swanson |
| 5,848,198 A | 12/1998 | Penn |
| 5,859,919 A | 1/1999 | Holland et al. |
| 2001/0064287 | 3/2011 | Alexandru |
| 2011/0064287 A1 | 3/2011 | Bogdan |
| 2011/0255371 A1* | 10/2011 | Jing et al. .......................... 367/73 |
| 2012/0090834 A1* | 4/2012 | Imhof et al. ............. 166/250.01 |

FOREIGN PATENT DOCUMENTS

CN  1602505  3/2005

OTHER PUBLICATIONS

Hanen et al., Multifractal modelling and 3D lacunarity analysis, Aug. 5, 2009, Elsevier, pp. 3604-3609.*
Plotnick et al., Lacunarity Analysis of Cyclic Stratigraphic Sequences, 1997.
Perlmutter et al., Hemispheric Asymmetry of the Marine Stratigraphic Record: Conceptual Proff of a Unipolar Ice Cap, Climate Control on Stratigraphy, 2003. pp. 51-66, No. 77, SEPM.
Perlmutter et al., Predicable Variations in the Marine Stratigraphic Record of the Nothern and Southern Hemispheres and Reservoir Potential, 22nd Annual Gulf Coast Section SEPM Foundation Bob F. Perkins Research Conference—2002, pp. 231-256.
Plotnick et al., Lacunarity analysis: A general technique for theanalysis of spatial patterns, The American Physical Society, May 1996, pp. 5461-5468, vol. 53 No. 5.

(Continued)

*Primary Examiner* — Sujoy Kundu
*Assistant Examiner* — Ricky Ngon
(74) *Attorney, Agent, or Firm* — Marie L. Clapp

(57) ABSTRACT

A system for and computer implemented method for analysis of data representative of subsurface properties of a subsurface region. The method includes transforming the data representative of subsurface properties of the subsurface region into transformed data in accordance with a selected criterion. A three dimensional window geometry to be applied to the transformed data is selected, based, at least in part, on expected feature sizes present, data sampling density and a size of the subsurface region. A plurality of values for a three dimensional lacunarity statistic are calculated by applying the selected three dimensional window geometry to randomly selected regions of the subsurface region, and correlating the calculated values to the subsurface properties of the subsurface region.

15 Claims, 9 Drawing Sheets

(56) References Cited

OTHER PUBLICATIONS

Dong, Lacunarity analysis of raster datasets and 1D, 2D, and 3D point patterns, Computers & Geosciences 35 (2009) 2100-2110.
Arizabalo, Ruben Dario, et al.; "Lacunarity of Geophysical Well Logs in the Cantarell Oil Field, Gulf of Mexico"; Geofisica Internacional, Mar. 2006, vol. 45, No. 2, pp. 99-113.
Notification of First Office Action, issued on May 6, 2013, during the prosecution of Chinese Application No. 201080048000.9.
International Search Report, issued on Jul. 18, 2011, during the prosecution of International Application No. PCT/US2010/056034.
Written Opinion of the International Searching Authority, issued on Jul. 18, 2011, during the prosecution of International Application No. PCT/US2010/056034.

* cited by examiner

SYSTEM AND METHOD FOR LACUNARITY ANALYSIS

FIELD OF THE INVENTION

The present invention relates generally to characterization of spatial data, and more particularly to use of lacunarity analysis in characterization of geological data.

BACKGROUND OF THE INVENTION

Quantification of spatial patterns is a useful tool in the natural sciences including geology. While fractal mathematics may be helpful in describing naturally occurring structures, the complexity of such mathematical approaches can lead to more, rather than less complex descriptions. In this regard, the concept of lacunarity has been found to be useful for describing spatial distributions of data sets, including those having clustered, random, fractal and multifractal distributions. Lacunarity allows for statistical investigation of binary and/or continuous data sets and is applicable to data of any dimensionality.

In a particular application, in evaluating the potential value of a newly identified reservoir or the potential value of capital projects within an existing developed reservoir, it may be useful to quantify the heterogeneity of a region of interest. In particular, such quantification may be used to evaluate and interpret patterns in stratigraphy including cyclicity of bed properties and connectivity of depositional bodies. Moreover, quantification of heterogeneity may be used to classify analog datasets, perform data/model comparisons, make flow assessments, and make predictions at scales below observable scales.

SUMMARY OF THE INVENTION

An aspect of an embodiment of the present invention includes a computer implemented method for analysis of data representative of subsurface properties of a subsurface region. The method includes transforming the data representative of subsurface properties of the subsurface region into transformed data in accordance with a selected criterion. A three dimensional window geometry to be applied to the transformed data is selected, based, at least in part, on expected feature sizes present, data sampling density and a size of the subsurface region. A plurality of values for a three dimensional lacunarity statistic are calculated by applying the selected three dimensional window geometry to randomly selected regions of the subsurface region, and correlating the calculated values to the subsurface properties of the subsurface region.

DESCRIPTION OF THE DRAWINGS

Other features described herein will be more readily apparent to those skilled in the art when reading the following detailed description in connection with the accompanying drawings, wherein.

DETAILED DESCRIPTION

Figure 1:
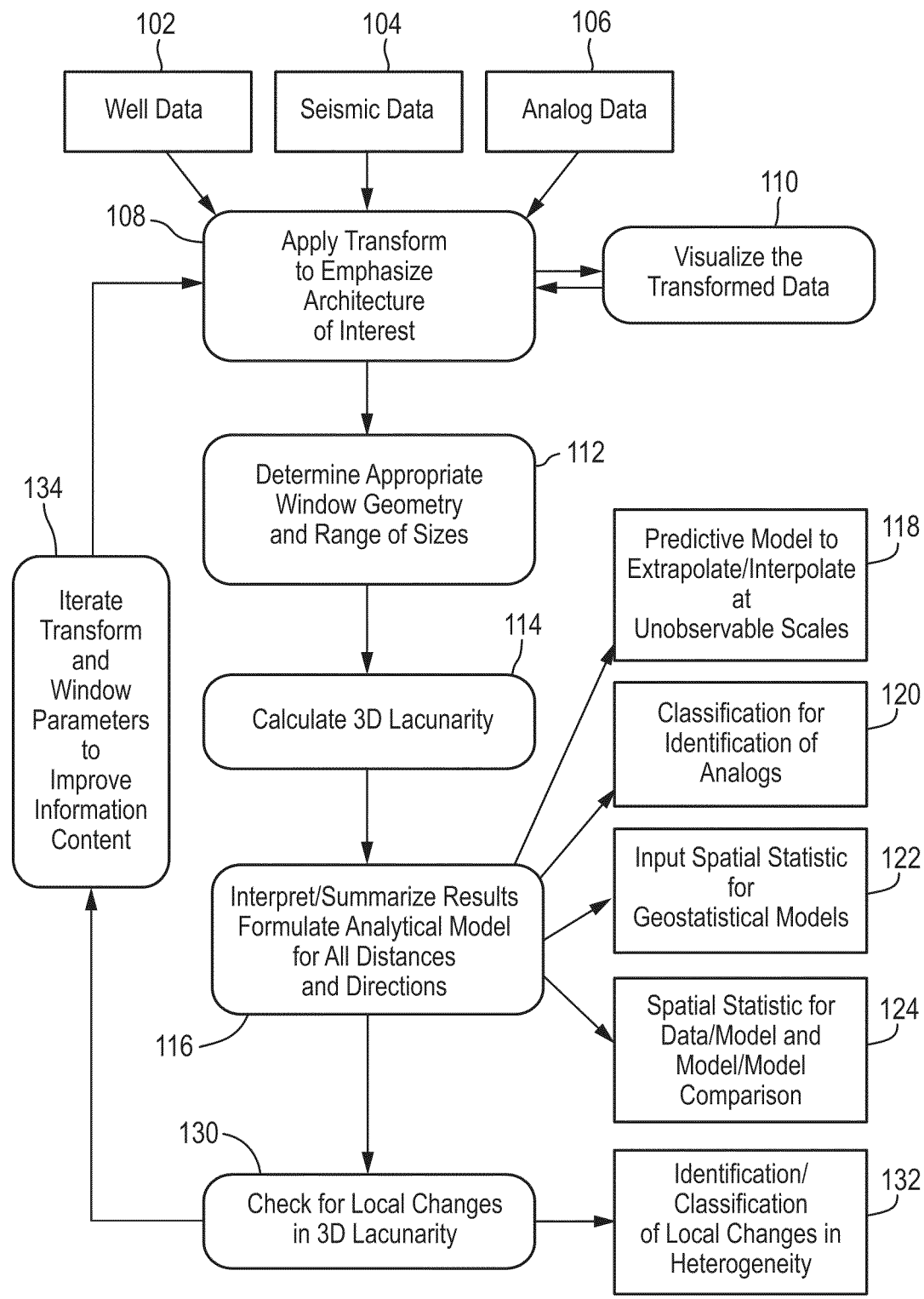
FIG. 1 is a flowchart illustrating a method or workflow in accordance with an embodiment of the present invention.

FIG. 1 schematically illustrates a workflow for evaluation of lacunarity of a geological region of interest. The workflow accepts as inputs data representative of physical characteristics of the region of interest. In this regard, subsurface properties of interest may include, for example, geophysical, geologic, stratigraphic, lithologic and reservoir properties. Particular data types may include well data 102, seismic data 104 and analog data 106, and combinations thereof. As will be appreciated, other data types relating to subsurface properties may be analyzed using similar techniques.

The data under examination is transformed 108 in order to emphasize the structures of interest. In one approach, this may mean that a threshold is applied in order to transform quantitative data into binary data. Such a binary transform may include, for example, a static threshold, or may allow for a fuzzy or space or time varying threshold. Likewise, the data may be transformed to a discrete or continuous distribution with a spatial and/or temporal filter that emphasizes specific spatial features, or features on a specific scale. By way of example, where it is expected that geological feature scale increases with increasing depth in well log or seismic data, the threshold may be selected to account for this by allowing for increasing threshold values as depth increases.

In another approach, the property may be transformed to a continuous distribution such as a parametric or nonparametric reference distribution or a discrete distribution that is selected in order to emphasize specific data value ranges, manage outliers or other selected results. In yet another approach, the transformation step may be omitted entirely and the data analyzed directly.

As an optional step, a visualization of the transformed data may be generated 110, for example on a display of a computer system, for review by an operator. This visualization provides a cross-check on the data, to ensure that the transformation has not so altered the data that analysis will not provide accurate or useful results. In response to the visualization, the operator may choose to use a different transformation on the original data before proceeding with the lacunarity analysis. This step may also be aided or conducted independently in an automated manner by an optimization engine with optimization criteria that refer to statistics of the transformed data that may indicate the discrimination of heterogeneity architecture not limited to global cumulative density functions, covariance functions, and transition probabilities.

Once the data is appropriately transformed and prepared for analysis, a window geometry, where geometry includes range of orientations, range of sizes, and shape of windows, is selected 112 for use in the lacunarity analysis. The geometry may be selected based on one or more factors including an expectation of feature sizes in the region of interest, resolution of the available data, and known or predicted anisotropies of the structures in the regions of interest. In one embodiment the shape of the window may be selected based on the expected feature shape.

Figure 2A:
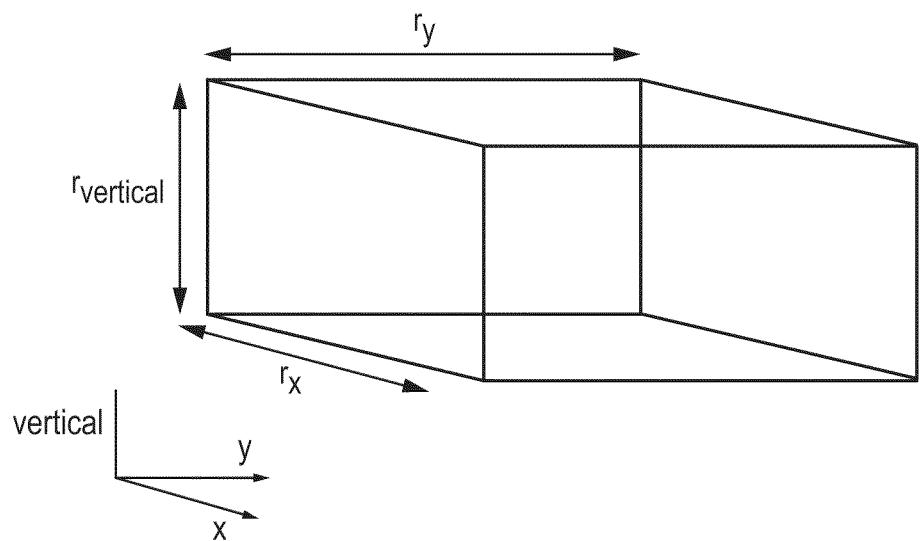
FIG. 2a-2d illustrate four possible moving windows that may be used to evaluate lacunarity in a data set in accordance with embodiments of the present invention.
Figure 2B:
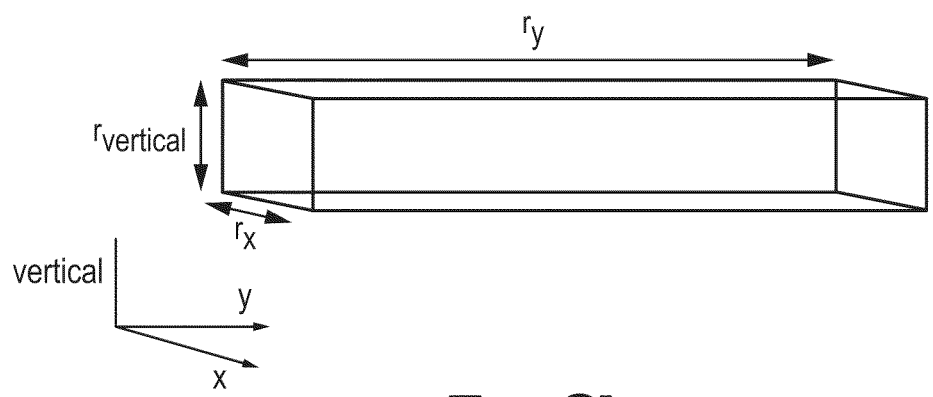
Figure 2C:
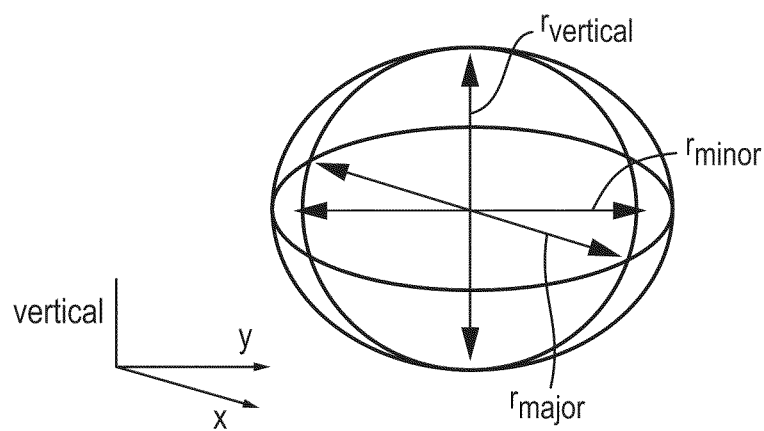
Figure 2D:
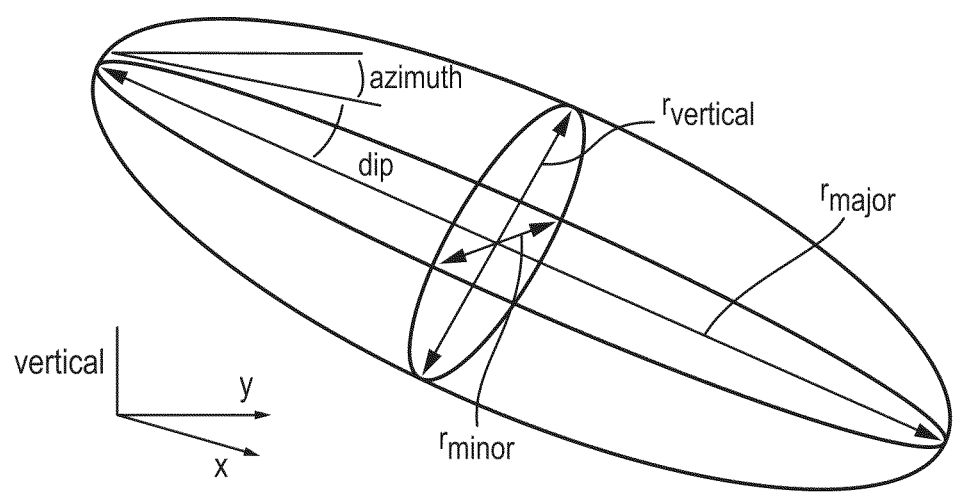

FIG. 2a illustrates a cuboid isotropic window that may be used for determining lacunarity in accordance with the prior art. On the other hand, FIGS. 2b-2d illustrate a variety of examples of anisotropic moving windows with variable orientation which may be used to evaluate lacunarity for the spatial data in embodiments of the present invention. Use of such variably oriented anisotropic windows may allow for characterization of spatial phenomena that themselves have anisotropies. Likewise, various directional lacunarity measurements may be made by altering the orientation. Once such lacunarities have been determined, they may be interpolated to characterize lacunarity over all directions and distance scales (see FIG. 2). The use of flexible size, orientation and geometry may allow for the ability to iteratively evaluate lacunarity using changing moving window parameters to maximize the information content (as measured by smoothness and uniqueness of the experimental results) of the statistic.

Once the geometry of the moving window is determined, the three dimensional lacunarity is calculated 114 using a moving window or "gliding box" algorithm. By way of example, for a data set converted into binary data, a box of length $r_1$, having height equal to $r_2$ and width of $r_3$ is placed at the origin of the data set. The number of occupied sites (window mass, s) within the window is determined, then the window is moved along the set and the mass is measured again. This process is repeated over the set, producing a frequency distribution of window masses $n(s, r_1, r_2, r_3)$. The process is then iterated over a number of window sizes. As an example, the moving window may be similar to that shown in FIG. 2b, and in each iteration the size of the box is changed, but the ratio between $r_1$ and $r_2$ is kept constant. FIGS. 2c and 2d illustrate alternate window geometries, specifically a spheroid isotropic window and a spheroid anisotropic window respectively.

The results of the calculated lacunarity are interpreted 116 and an analytical model for all, or some, distances and/or directions is created. In this regard, such models may include, for example, a predictive model to extrapolate or interpolate the data into unobservable scales 118, a classification model for identification of analogs 120, a spatial statistic for geostatistical models 122, and/or a spatial statistic for data-model and model-model comparisons 124.

By way of the models described above, the calculated values may be correlated to subsurface parameters or properties including, but not limited to: net-to-gross, univariate and spatial distributions of porosity, permeability, shale barriers, reservoir elements and associated stratigraphic geometries and lithologies.

In an embodiment, an additional step may be included to check for local changes in lacunarity 130. In this approach, identified local changes may be used to identify and/or classify 132 local changes in heterogeneity in the region of interest. As an additional step, the transform and window parameters may be adjusted, either according to a predetermined schedule, or in response to operator input based on analysis of the models, and the process iterated 134 using the adjusted parameters.

Figure 3:
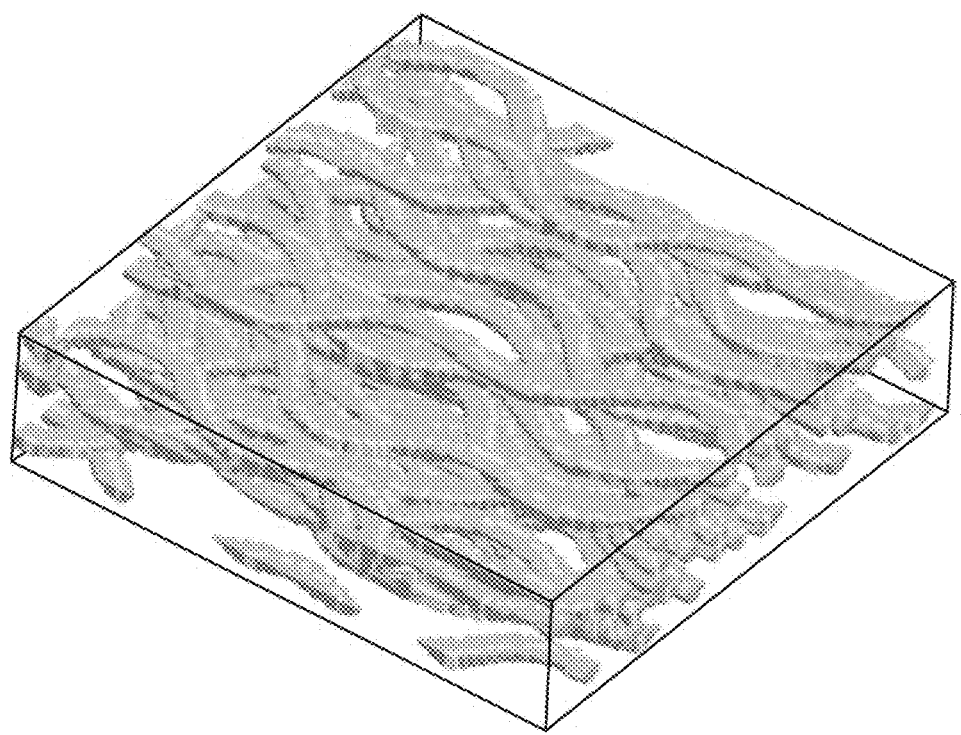
FIG. 3 is an example of a three dimensional reservoir heterogeneity architecture that may be evaluated using lacunarity characterizations in accordance with embodiments of the present invention.
Figure 4:
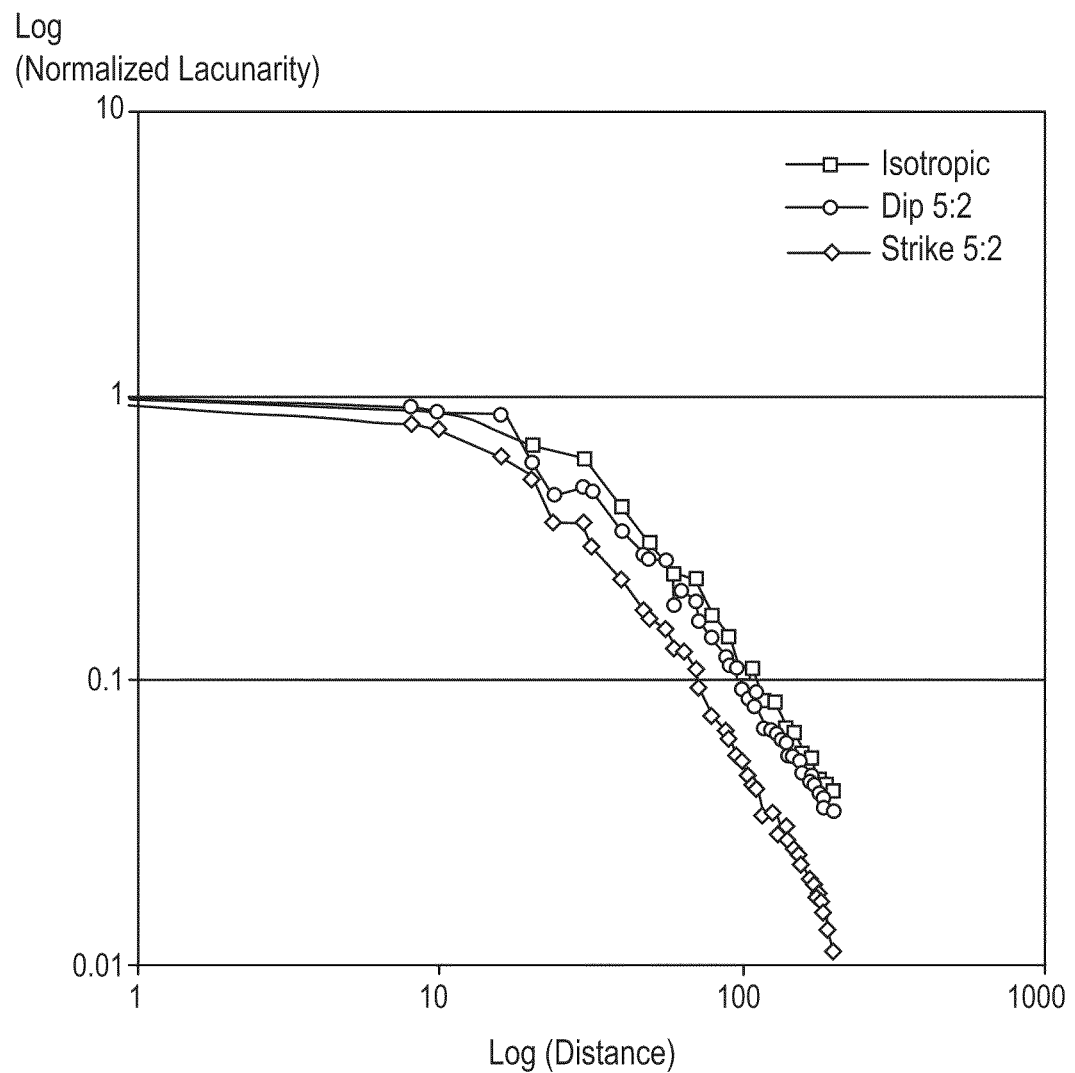
FIG. 4 is a log-log plot of a lacunarity statistic for the reservoir heterogeneity architecture using an isotropic window, using a window longer along a dip direction and a window longer along a strike direction.

In an example, the reservoir connectivity data illustrated in FIG. 3 is analyzed in accordance with the foregoing method. FIG. 4 is a log-log plot illustrating results for three different approaches to lacunarity analysis. In the first, an isotropic window was used, resulting in the topmost line. In the second, a rectangular cuboid anisotropic window (as illustrated in FIG. 2b) having a length to width ratio of 5:2 along a dip direction was used, resulting in the middle line. In the third, a rectangular cuboid anisotropic window having a length to width ratio of 5:2 along a strike direction was used, resulting in the lowermost line. As can be seen, the lacunarity statistic for the strike oriented window shows relatively more clustering than do the other two lines.

In general, moving window statistics rely on the exhaustive sampling of the spatial heterogeneity by visiting all possible moving window locations. In large models, this leads to very high numbers of calculations, especially where a large number of window orientations, geometries and sizes are used. The inventors have determined that a reasonable approximation to lacunarity may be calculated by randomly sampling a small subset of possible moving window locations. For each sampled location, the lacunarity statistics are calculated by applying the selected three dimensional window geometry with a range of sizes and orientations. For each window configuration the results from the limited number of randomly sampled locations are applied as an approximation for the more computationally expensive exhaustive gliding box sampling scheme. This results in the lacunarity measure for a single window size and orientation. Combining the resulting lacunarity measures for all window sizes and orientations results in a full 3D lacunarity model. The pooling of these plurality of values over the entire model represents the global full 3D lacunarity characterization, while pooling over local search neighborhoods (see the intermediate window in FIG. 6) represents the non-stationary full 3D lacunarity characterization.

Figure 5:
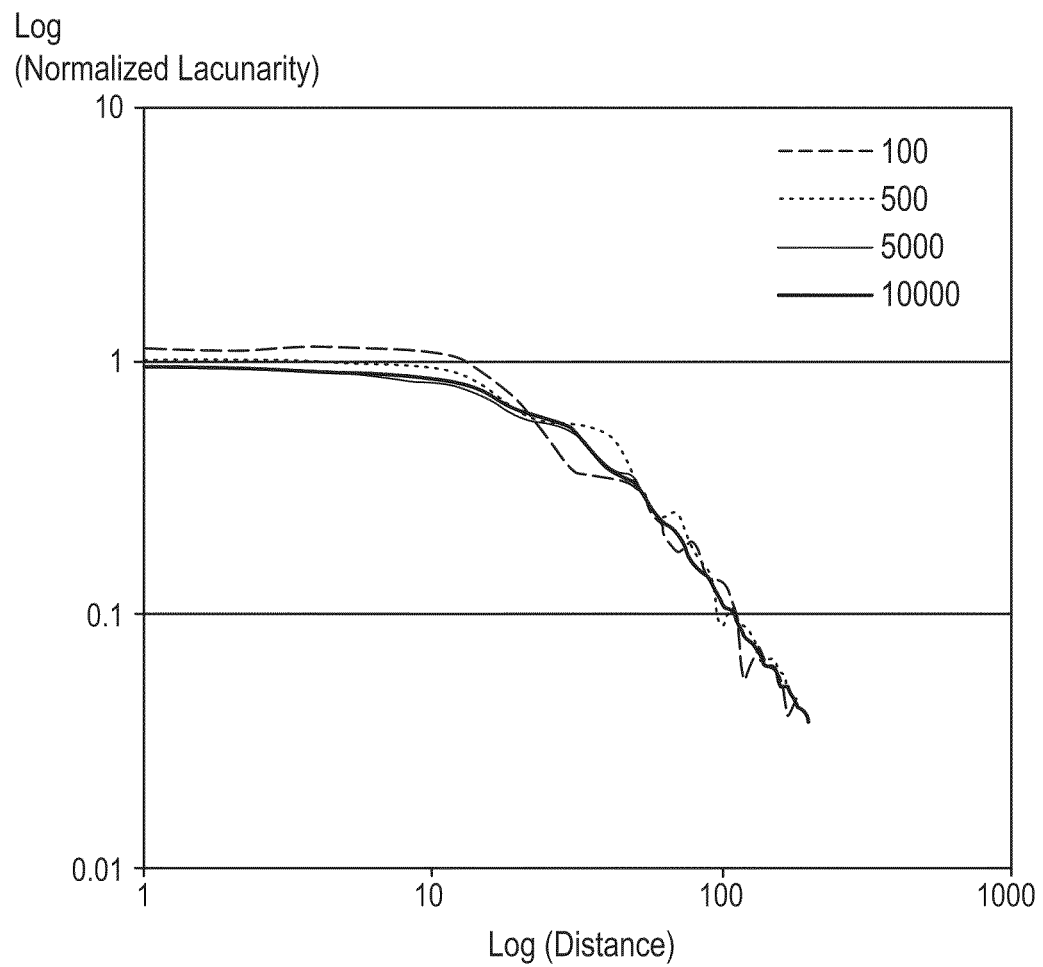
FIG. 5 is a log-log plot of a lacunarity statistic for the reservoir heterogeneity architecture, sampled varying numbers of times indicating the increasing solution accuracy with increasing number of samples.

As an example of the potential computational savings, a 1,000,000 cell model with dimensions 100×100×100 cells would have 753,571 possible window positions for a 10×10×10 window size. As illustrated in FIG. 5, using random sampling, the lacunarity statistic appears to show stability by 5000 samples. While not illustrated, the inventors have found that as few as 1,000 random windows can provide stable statistics, resulting in an increase in computational efficiency of over 750 times over the worst case (assuming an inefficient gliding box method). In order to ensure fast convergence, stratified sampling methods may be applied. That is, a set of sub-regions may be defined, and some number of the random samples are taken from each sub-region. This approach may prevent a random selection of a large run of samples within a particular, non-representative portion of the region of interest, as might occur as a result of a truly random selection.

One issue that may arise with the random sampling approach is that, in general, the required number of samples to obtain a reasonable approximation is dependent on the spatial heterogeneity, specifically the level of statistical invariance, and window size. As a result, it may not be possible to know beforehand how many samples are required to produce good statistics. An approach to this problem is to measure lacunarity for a progressively larger number of random samples and monitor a rate of change in the result. Once the rate of change decreases to below a selected tolerance, the iterative sampling may be stopped.

Figure 6:
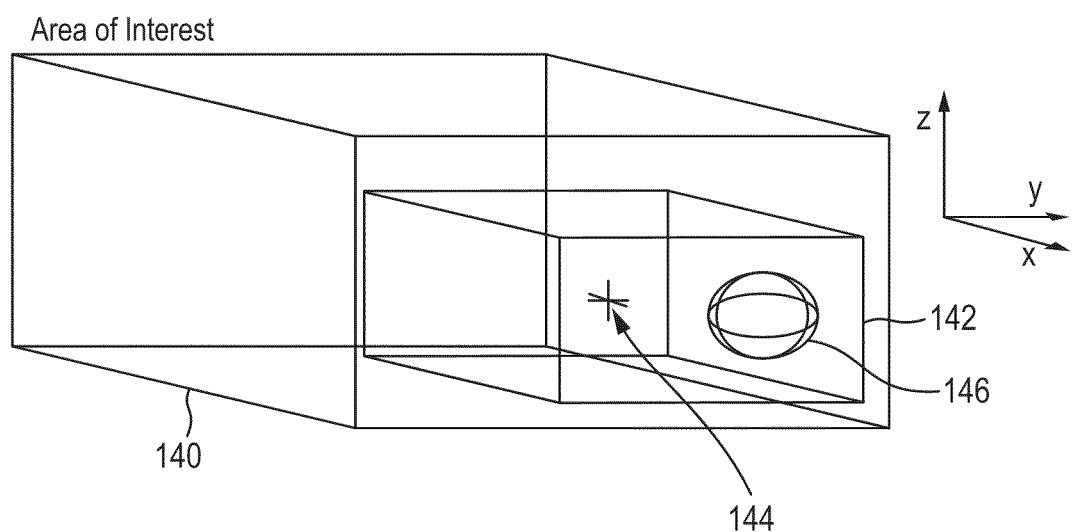
FIG. 6 is a conceptual illustration of a region of interest showing an intermediate region and a moving window within the intermediate region.
Figure 7:
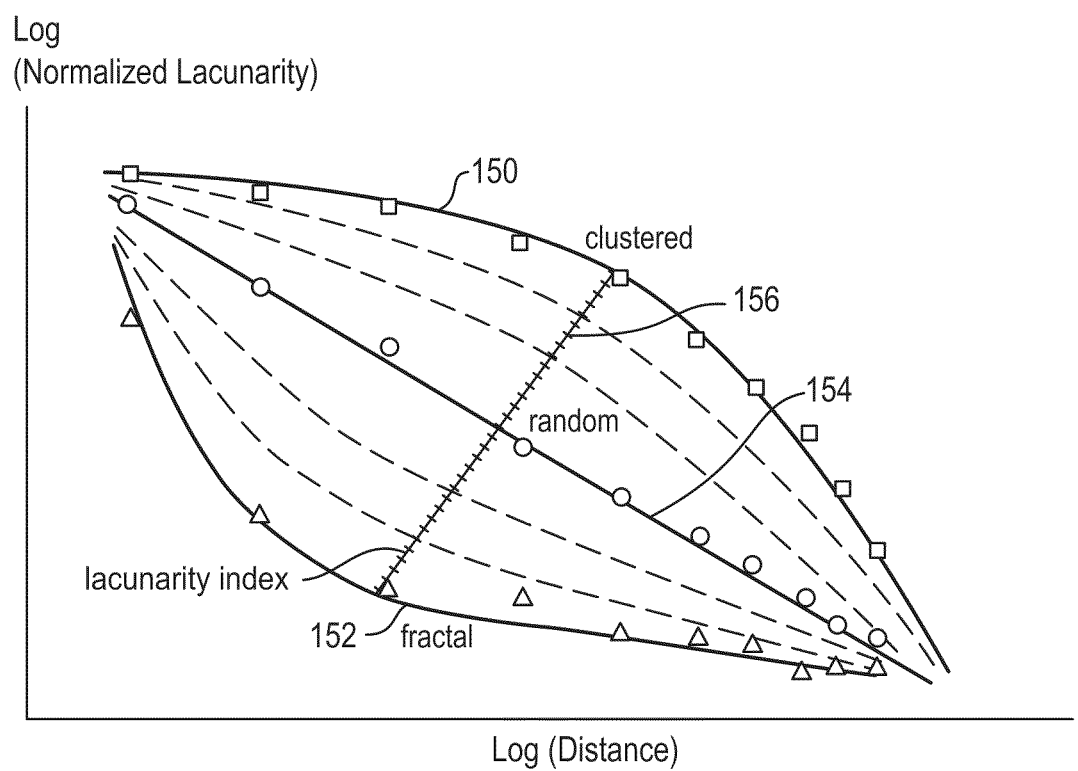
FIG. 7 is a log-log plot illustrating a classification system for lacunarity statistics.

In an embodiment, local lacunarity statistics may be used to characterize trends and changes in heterogeneity over an exploration or reservoir area of interest 140, as illustrated in FIG. 6. In this regard, a local lacunarity measure may be generated by calculation of lacunarity over an intermediate window 142, having a size smaller than the entire model and larger than the moving window 146. Once calculated, the local lacunarity is assigned to the centroid 144 of the intermediate window. The intermediate window size should be chosen to be large enough that there is a reasonable number of possible moving window positions for statistical inference of local lacunarity and not so large as to smooth out local features. This method may be directly applied to detect, segment and/or characterize features and/or to assign reservoir potential in any dataset (e.g., well logs or seismic information). In another embodiment, this local lacunarity measure may be applied as a transform to emphasis specific heterogeneity features as discussed above. Once determined by calculation, lacunarity measures may be parameterized or summarized to aid in classification and prediction. FIG. 7 is a log-log plot illustrating three typical forms of experimental lacunarity and their respective interpretations. The downward concave curve 150 at the top of the oval represents lacunarity statistics for a clustered data set. The upward concave curve 152 at the bottom represents a data set that has fractal characteristics. The middle straight line 154 represents lacunarity of a random data set.

Based on this construction, a lacunarity index may be defined that summarizes the experimentally determined lacunarity statistics in a single value that spans from fractal to random to clustered form based on the proximity of the experimental results to each form. This index is represented in FIG. 7 by the line 156 extending perpendicular to the line representing random statistics 154. This approach provides a simple statistic for summarizing results, visualizing local lacunarity and for use in model comparison. Moreover, for local lacunarity statistics in a larger region, the index value may be assigned to the centroid of each local region, allowing for simple indication of variation within the large region without requiring separate graphical depictions of lacunarity curves for each region.

If distinct forms are observed over different distance scales and orientations then these may be separated and assigned separate lacunarity indices. In addition, the primary orientation of specific spatial forms may be summarized by a vector field over the area of interest. All variants of these summarizations may be considered, including statistical summarizations and first, second, and higher derivatives.

In an embodiment, a full three dimensional model of lacunarity may be generated that allows for characterization of lacunarity over all directions and distances. Such a model may be based on calculation of experimental lacunarity in primary directions of continuity (horizontal major, minor and vertical) then, based on the calculated values, interpolation and extrapolation for all other possible directions. In this approach, numerical analog models are used to define realistic lacunarity forms over all possible directions and distances. These forms are then used to constrain interpolation and extrapolation of lacunarity measures to ensure plausible or geometrically consistent results and to define associated uncertainty. In one embodiment the full 3D model of lacunarity may be applied to generate lacunarity-based stochastic realizations of heterogeneity or to constrain/post-process traditional geostatistical methods for improved reservoir architecture prediction and modeling.

Figure 8:
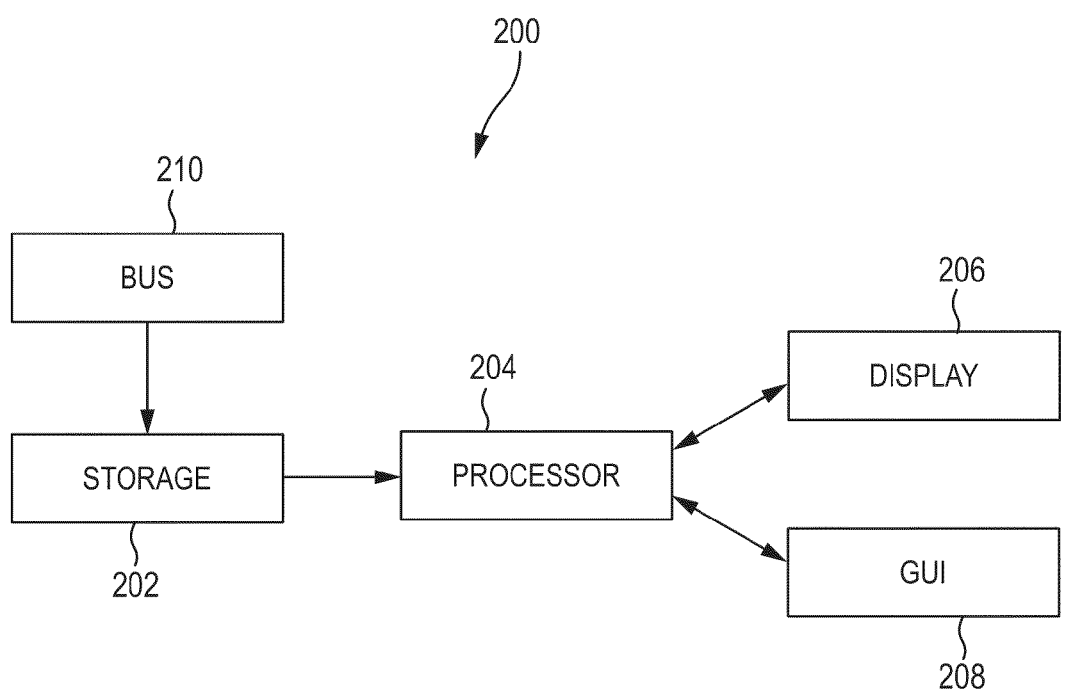
FIG. 8 is a schematic illustration of an embodiment of a system for performing methods in accordance with embodiments of the present invention.

A system 200 for performing the method is schematically illustrated in FIG. 8. A system includes a data storage device or memory 202. The stored data may be made available to a processor 204, such as a programmable general purpose computer. The processor 204 may include interface components such as a display 206 and a graphical user interface 208. The graphical user interface may be used both to display data and processed data products and to allow the user to select among options for implementing aspects of the method. Data may be transferred to the system 200 via a bus 210 either directly from a data acquisition device, or from an intermediate storage or processing facility (not shown).

Those skilled in the art will appreciate that the disclosed embodiments described herein are by way of example only, and that numerous variations will exist. The invention is limited only by the claims, which encompass the embodiments described herein as well as variants apparent to those skilled in the art.

What is claimed is:

1. A computer implemented method for analysis of data representative of subsurface properties of a subsurface region, comprising:
    transforming, using a processor, the data representative of subsurface properties of the subsurface region into transformed data in accordance with a selected criterion;
    displaying the transformed data on a computer system;
    using a graphical user interface for selecting and inputting a three dimensional window geometry to be applied to the transformed data and selecting one or more azimuths of the three-dimensional window geometry, based, at least in part, on expected feature sizes present, data sampling density and a size of the subsurface region;
    randomly, using the processor, selecting a plurality of sub-regions of the subsurface region according to the azimuths based on the three dimensional window geometry;
    calculating, using the processor, a plurality of values for a three dimensional lacunarity statistic by applying the selected three dimensional window geometry to the sub-regions of the subsurface region;
    correlating, using the processor, the calculated values to the subsurface properties of the subsurface region; and
    using the calculated values, using the processor, to characterize changes in heterogeneity over a subsurface reservoir area of interest and to evaluate the subsurface properties of the subsurface region of interest.

2. The method as in claim 1, wherein the three dimensional window geometry comprises an anisotropic geometry.

3. The method as in claim 2, wherein the anisotropic geometry comprises an ellipsoid or rectangular cuboid.

4. The method as in claim 1, wherein the selecting is further based on a geometrical extent of the data with respect to the subsurface region.

5. The method as in claim 1, wherein the correlating comprises: comparing the calculated values to calculated values for further subsurface regions for which the subsurface properties are known or for which a numerical analog model exists; and determining a classification of the subsurface region of interest based on the comparison.

6. The method as in claim 1, wherein the sub-regions are constrained such that each of the sub-regions is sampled at least a selected minimum number of times.

7. The method as in claim 1, further comprising, after the transforming and prior to the selecting, generating a visualization of the transformed data.

8. The method as in claim 7, wherein the transforming further comprises a re-transforming of the data to produce the binary data, the re-transforming being based on user input in response to the visualization.

9. The method as in claim 1, wherein the calculating a plurality of values for a three dimensional lacunarity statistic further comprises: defining a plurality of intermediate windows representing respective volumes of the subsurface region, each intermediate window having a volume larger than the selected three dimensional window geometry; calculating lacunarity statistics for each of the intermediate windows; and pooling the results of all lacunarity calculations within each intermediate window to represent a local lacunarity statistic.

10. The method as in claim 1, further comprising: defining, for the subsurface region, a lacunarity index based on a shape of a plot of the plurality of values.

11. The method as in claim 10, wherein the lacunarity index describes a degree of match of the plurality of values with characteristic forms representing theoretical spatial distributions.

12. The method as in claim 1, where the transformed data comprises binary or categorical data.

13. The method as in claim 1, wherein selecting the geometry comprises selecting a size of the three-dimensional window geometry, based, at least in part, on expected feature sizes present, data sampling density and a size of the subsurface region.

14. The method as in claim 1, wherein selecting the geometry comprises selecting a shape of the three-dimensional window geometry, based, at least in part, on expected feature sizes present, data sampling density and a size of the subsurface region.

15. The method as in claim 1, wherein calculating the plurality of values for the three dimensional lacunarity statistic comprises calculating the plurality of values for each of the azimuths.

* * * * *